Figure 18:
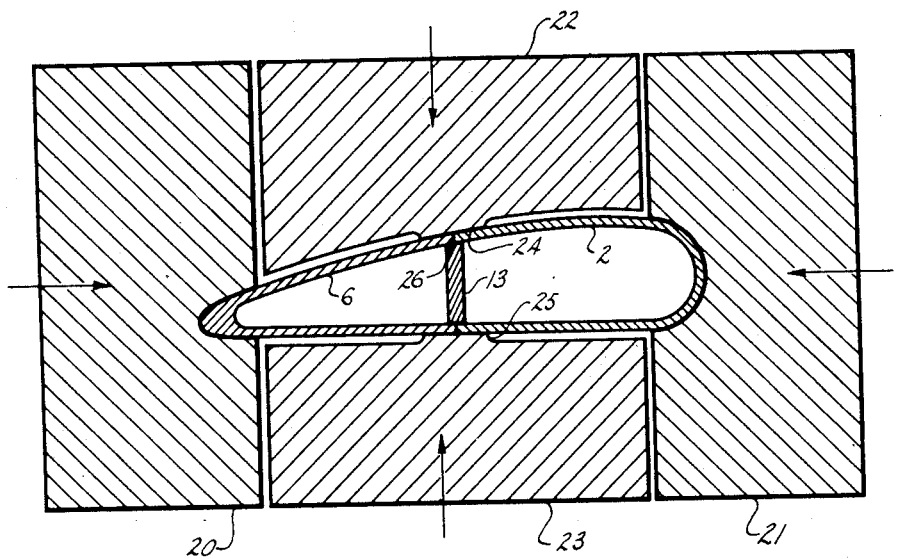

Sept. 23, 1947.  W. S. HOOVER  2,427,785
METHOD OF MAKING HOLLOW STEEL PROPELLER BLADES
Filed April 30, 1943  5 Sheets-Sheet 1
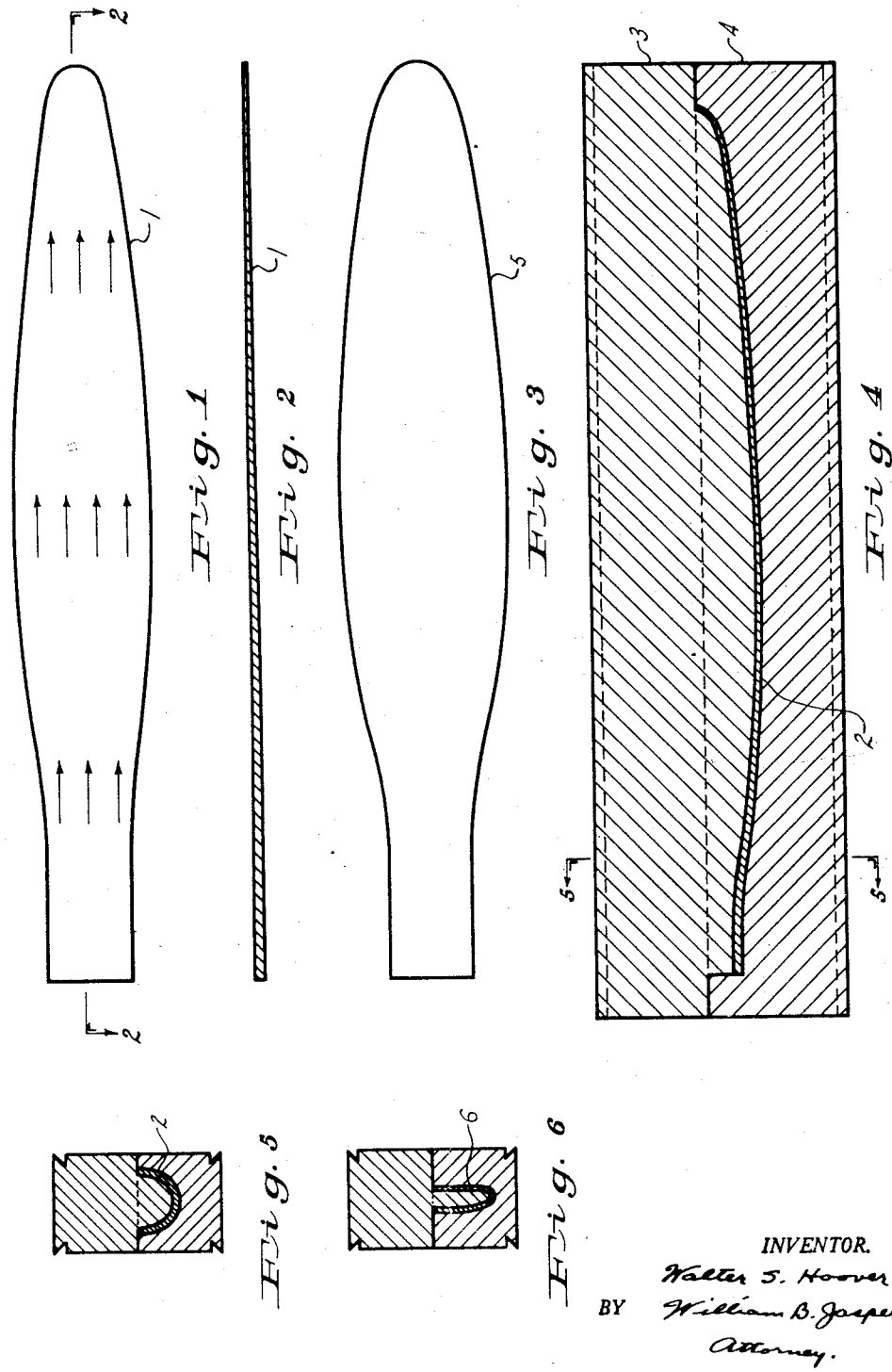
INVENTOR.
Walter S. Hoover
BY William B. Jaspert
Attorney.

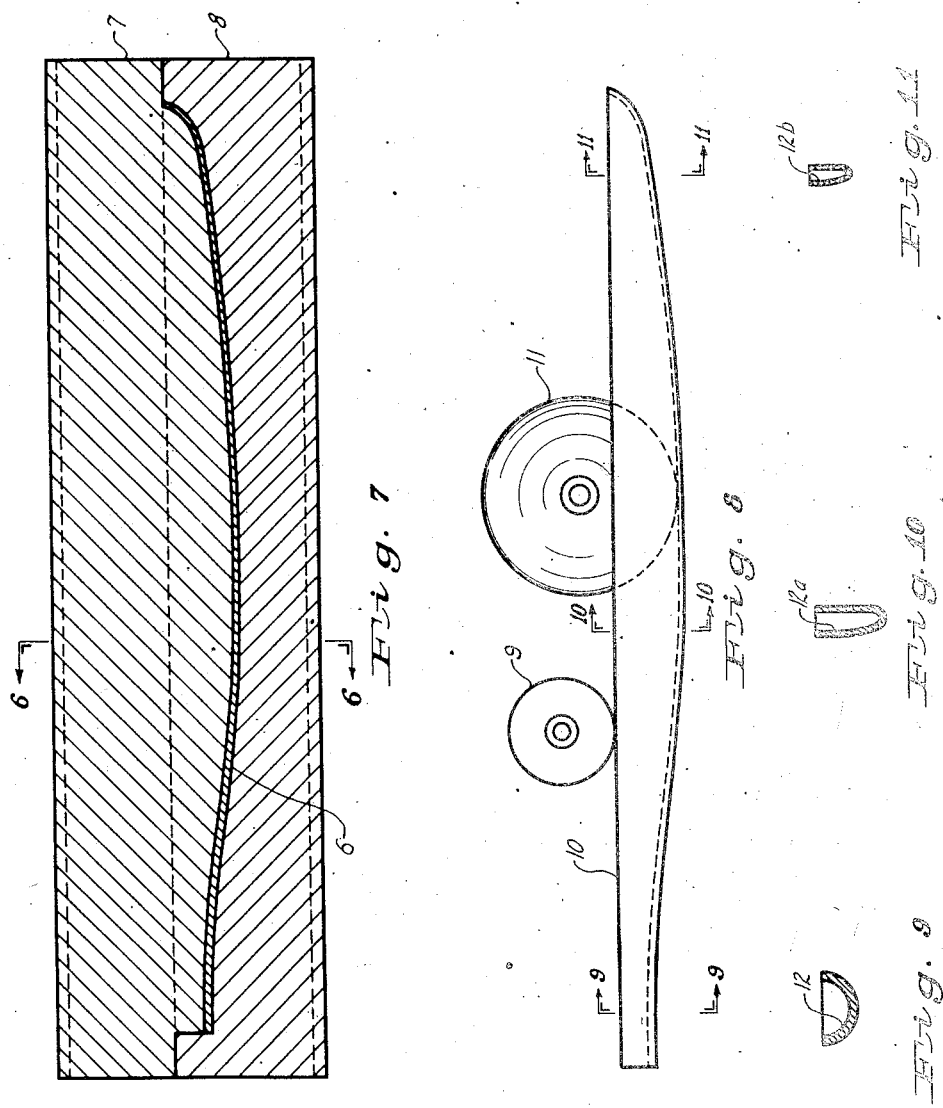

Sept. 23, 1947.  W. S. HOOVER  2,427,785
METHOD OF MAKING HOLLOW STEEL PROPELLER BLADES
Filed April 30, 1943  5 Sheets-Sheet 3
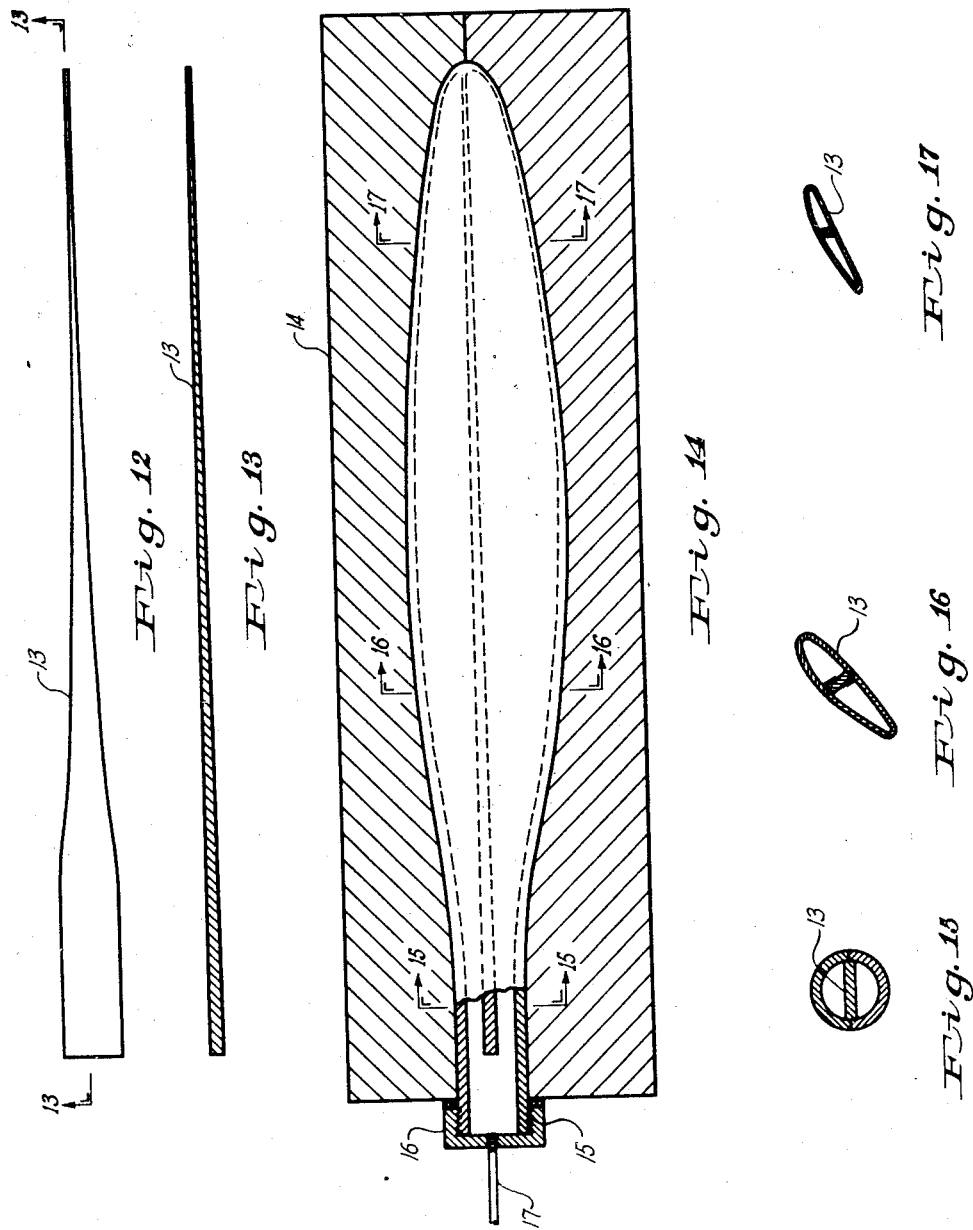
INVENTOR.
Walter S. Hoover
BY William D. Jaspert
attorney.

Sept. 23, 1947.   W. S. HOOVER   2,427,785
METHOD OF MAKING HOLLOW STEEL PROPELLER BLADES
Filed April 30, 1943   5 Sheets-Sheet 4

INVENTOR.
Walter S. Hoover
BY William B. Jaspert
Attorney.

Sept. 23, 1947.   W. S. HOOVER   2,427,785
METHOD OF MAKING HOLLOW STEEL PROPELLER BLADES
Filed April 30, 1943   5 Sheets-Sheet 5
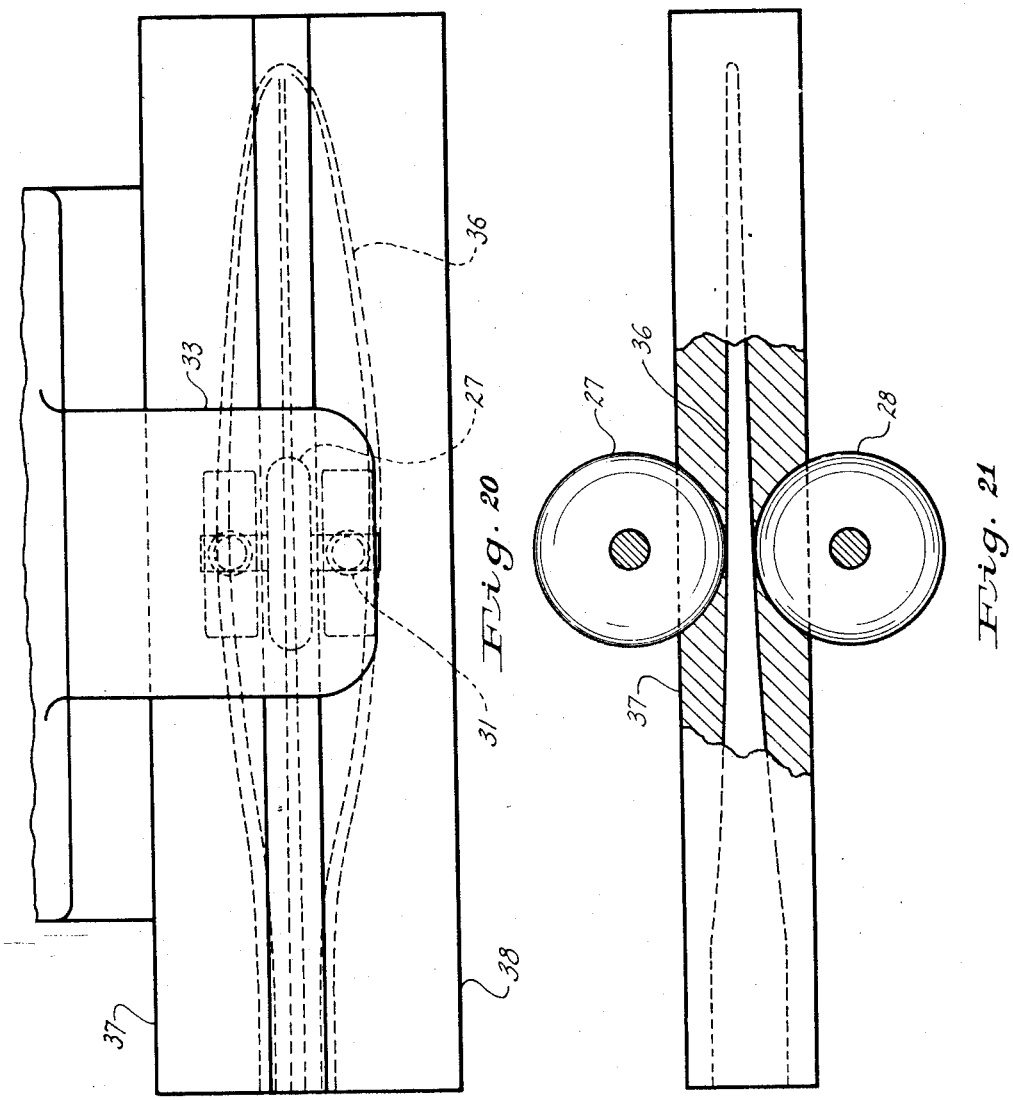
INVENTOR.
Walter S. Hoover
BY William B. Jaspert
Attorney.

Patented Sept. 23, 1947

2,427,785

UNITED STATES PATENT OFFICE 2,427,785

METHOD OF MAKING HOLLOW STEEL PROPELLER BLADES

Walter S. Hoover, West Hartford, Conn.

Application April 30, 1943, Serial No. 485,189

1 Claim. (Cl. 29—156.8)

1

This invention relates to new and useful improvements in a method of making hollow steel propeller blades, and it is among the objects thereof to provide a method of forming hollow steel blades which shall eliminate heat treating and fabricating flaws in the finished product.

It is another object of the invention to provide a composite propeller structure formed of leading and trailing sections joined with a transverse strut to produce a hollow blade in which failure is minimized in the heavily stressed areas, which especially adapts such hollow steel propeller structures for use in variable pitch propeller hubs.

It is a further object of this invention to provide a method of fabrication that imposes no limitation on the width of chordal section of aerofoil blades.

Another advantage of the composite construction is that the separately formed trailing and leading sections and the reinforcing strut lend themselves to internal grinding operations, so that the inner surface of the propeller will have a smooth ground finish that minimizes failure and which makes it possible to maintain good radii in the trailing edge hollowness of the blade sections.

In Patent No. 1,988,202, granted to me January 15, 1935, I have disclosed a hollow steel propeller blade having a transverse reinforcing strut, and in Patent No. 2,042,099, granted May 26, 1936, I have disclosed a one-piece propeller blade structure having a welded seam at the back of the blade.

The present invention embodies the principle of the designs disclosed in the above-mentioned letters patent and is an improvement thereon in the method of prefabricating the half-sections and strut and in joining them together by welding.

The invention will become more apparent from a consideration of the accompanying drawings constituting a part hereof in which like reference characters designate like parts and in which:

Fig. 1 is a top plan view of a forging for forming the trailing edge of a propeller blade;

Fig. 2 a vertical cross-sectional view taken along the longitudinal centerline of Fig. 1;

Fig. 3 a top plan view of a forging for forming the leading edge of a propeller blade;

Fig. 4 a vertical cross-sectional view of a sectional forming die with the shaped propeller section disposed in the matrix portion thereof;

Fig. 5 a cross-sectional view of the die of Fig. 4 taken along the line 5—5 when the trailing edge of the propeller section is formed;

2

Figure 19:
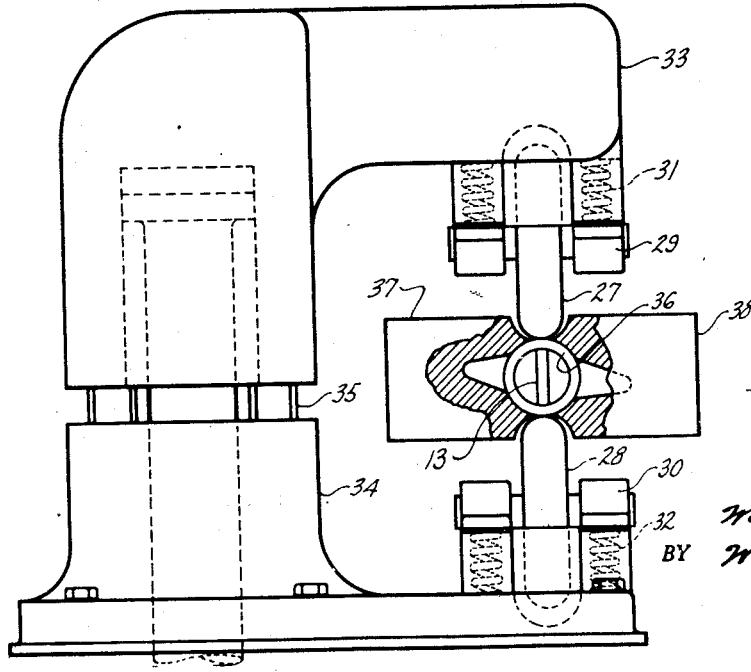

Fig. 6 a similar view of a forming die taken along the line 6—6 of Fig. 7 shaped to form the leading section of the propeller blade;

Fig. 7 a vertical section longitudinally of the die for forming the leading section shown in Fig. 6;

Fig. 8 a front elevational view diagrammatically illustrating the method of grinding the edges and interior walls of the blade sections;

Fig. 9 a vertical cross-section of the blade section taken along the line 9—9, Fig. 8;

Fig. 10 a similar view taken along the line 10—10, Fig. 8;

Fig. 11 a similar view taken along the line 11—11, Fig. 8;

Fig. 12 a top plan view of a transverse strut for reinforcing the propeller blade;

Fig. 13 a cross-section taken along the line 13—13, Fig. 12;

Fig. 14 a vertical section of a pitch twist die for shaping the finished blade after annealing;

Figs. 15, 16 and 17 are transverse views of the finished blade, respectively, taken along the lines 15—15, 16—16 and 17—17 of Fig. 14;

Fig. 18 a cross-section of the blade assembly in a welding jig;

Fig. 19 a side elevational view of a welding machine for joining composite propeller blades;

Fig. 20 a top plan view of the machine of Fig. 19; and

Fig. 21 a front elevational view of a pair of welding electrodes in working relation to the blade for welding.

With reference to Figs. 1 to 7 of the drawings, the numeral 1 designates a rough forging of graduated cross-section, as shown in Fig. 2, which is annealed and placed in the forging die of Fig. 4 to form the trailing edge section 2 of the propeller blade. The blanks may also be formed by cold-drawn or hot-drawn extrusions with maximum thickness at what is to be the blade root and minimum thickness at tip ends. The forging die comprises upper and lower pressure platens 3 and 4, respectively, which are mounted in guides (not shown), and subjected to suitable pressure to shape the metal as shown in Fig. 5.

The blank of Fig. 3 designated by the numeral 5 is of larger area than the blank of Fig. 1 and is forged to the leading blade section 6 of Fig. 6 by the shaping die of Fig. 7 which comprises the upper and lower pressure platens 7 and 8, respectively. The rough forging 5 for forming the leading edge is of graduated cross-section, the same as the rough forging of Fig. 1, as shown in Fig. 2.

After the trailing and leading blade sections are formed, they are subjected to an edge-grinding operation in the manner shown in Fig. 8, with the grinding wheel 9 passing over the edge 10 of the blade and the hollow interior of the blade is subjected to a surface-grinding operation by the grinding wheel 11 of selected radii to produce a smooth ground finish that will remove fabricating flaws and minimize failure in the heavily stressed areas during the service period, the numerals 12, 12a and 12b designating the ground surfaces of the leading propeller section, and both the leading and the trailing sections are internally and edge-ground.

The numeral 13, Fig. 12, designates a strut, shown in Figs. 15, 16 and 17, which is joined to the leading and trailing sections at their abutting edges. The strut 13 is ground all over and is of graduated cross-section as shown in Fig. 13. The strut and leading and trailing sections of the blades are butt-welded to form an integral structure open at the root of the blade, with all of the interior surfaces smoothly ground.

When finished, the blade is annealed to relieve all stresses in the metal and around the welds. The blade is then placed in a pitch twist forming die 14, Fig. 14, and the blade root 15 is provided with a coupling 16 connected to a source of fluid pressure at 17 which is applied after the die 14 is closed. The internal pressure will expand the metal to the pitch twist contour of the die 14.

After the pitch twist operation, the blade is heat treated in a non-oxidizing atmosphere to prevent scaling which results in uniformity of tensile strength in the leading and trailing section forgings and in the transverse strut, and also provides uniform hardness of all their surfaces.

The final operation consists of grinding the entire outer surface of the blade to a smooth finish, which can be done manually by flexible grinders or by automatic grinding machinery. The finished blade may be nitrated or finished by an oxidizing process or plating, as desired, and the blade is balanced prior to the surfacing operations.

Because of the odd shape of the propeller blades, special welding equipment such as disclosed in Figs. 18 to 21 inclusive may be employed. In the form shown in Fig. 18, the strut 13 is shown assembled with the leading edge section 6 and the trailing edge 2 in a jig comprising blocks 20 and 21 and are joined by contact with electrodes 22 and 23 having contact surfaces 24 and 25 of sufficient area to span the joints 26 and to subject the abutting blade edges and strut edges to a welding pressure when current is passed therethrough. In this form of welding apparatus, the electrodes and jig blocks extend the full length of the blade and are complementary to the shape of the blade in the varying cross-sections.

In Figs. 18 to 21 inclusive a method of welding the composite elements of the blade is shown which employs roller electrodes 27 and 28 yieldingly mounted in bearings 29 and 30 backed by coil springs 31 and 32. The upper roller is mounted on an arm 33 that is adjustable vertically on a support 34 that is provided with guides 35 to maintain proper alignment.

A propeller blade structure generally designated by the numeral 36 is assembled in jig blocks 37 and 38 with the abutting edges of the leading and trailing sections in vertical alignment, in which position the minor axis of the strut 13 is likewise in vertical position. The roller electrodes are energized in a suitable manner to pass a welding current through the propeller joint and the pressure of the rollers as exerted by springs 31 and 32 effects the integral joining of the fused surfaces.

The relation of the roller electrodes 27 and 28 to the blade 36 and the manner of traversing the abutting edges to be welded is more clearly shown in Figs. 20 and 21 of the drawings and requires no further description.

The butt-weld operation is thermally controlled to obtain a substantially homogeneous metal throughout the finished blade. It will be noted that the butt-weld seams are on the front and back faces of the blade and are incorporated in the blade areas subjected to minimum stress. The transverse strut eliminates breathing and minimizes blade deflection; it also functions to tie the sections together, resulting in a strong and durable hollow propeller blade.

While, as shown, the method of forming the blade consists of shaping by forging of the edges, it will be evident that they may also be formed by rolling and forging. The better quality of material is obtained by rolling and extruding the metal cold, and obtaining the graduated section before the half-forming die operation is performed.

In the formation of the leading and trailing half-sections of the blades, the pitch twisting of the propeller is omitted. The pitch twisting is accomplished after the blade has been fully welded and the strut has been incorporated in the blade by putting the entire blade into the forming die 14.

It is evident from the foregoing description of the invention that hollow propeller blades made in accordance therewith are surface-ground over their entire inner and outer surfaces and are substantially free of fabricating and heat treating flaws. This form of blade is especially adapted for the severe use under which blades are stressed when employed in variable pitch propeller hubs with almost instant change of pitch angle brought about by enormous pitch adjusting forces.

The method of construction is especially adapted to produce maximum chordal section of the aero-foil which is the trend in blade design to develop maximum horsepower at high altitudes and high speeds with minimum blade diameter.

Although one embodiment of the invention has been herein illustrated and described, it will be evident to those skilled in the art that various modifications may be made in the details of construction without departing from the principles herein set forth.

I claim:

The method of making hollow propeller blades which comprises forging a blank of graduated cross-section from end to end transversely of the faces of the blank, placing the same in a forming die and shaping it to the airfoil contour of a leading blade section, forging another blank to the airfoil shape and graduated cross-section required to form the trailing section of a propeller blade, placing the same in a forming die and shaping said section to a trailing blade section, grinding the entire inner surfaces of said shaped leading and trailing edges to the desired radius and surface smoothness, forging a strut of substantially the length of the blade and graduated cross-sectional area, surface-grinding said strut over the entire area thereof, assembling said strut and hollow ground blade sections in abutting relation with the abutting edges of the blade sections in contact with the side edges of the strut, butt-welding the abutting edges of the half sections and strut to constitute an integral hollow propeller blade, assembling the integrally joined propeller structure in a pitch twist die, and connecting the hollow propeller interior to a source of fluid pressure to subject the inner faces of the blade to shaping pressure to conform the propeller blade to the pitch contour of the die.

WALTER S. HOOVER.

REFERENCES CITED

The following references are of record in the file of this patent:

UNITED STATES PATENTS

| Number | Name | Date |
|---|---|---|
| 2,007,775 | Smith | July 9, 1935 |
| 1,781,160 | Carns | Nov. 11, 1930 |
| 2,231,749 | Damerell | Feb. 11, 1941 |
| 1,988,202 | Hoover | Jan. 15, 1935 |
| 1,943,560 | Squires | Jan. 16, 1934 |
| 1,996,850 | Bendix | Apr. 9, 1935 |
| 2,231,772 | Nelson | Feb. 11, 1941 |
| 2,025,555 | Stahl | Dec. 24, 1935 |

FOREIGN PATENTS

| Number | Country | Date |
|---|---|---|
| 162,526 | Switzerland | June 30, 1933 |